(12) United States Patent
Dollinger et al.

(10) Patent No.: US 6,516,054 B1
(45) Date of Patent: Feb. 4, 2003

(54) METHOD FOR ADJUSTING CURRENT LEVELS, WHICH HAVE BEEN FALSIFIED BY OFFSET-CURRENT LEVELS, IN A SUBSCRIBER LINE CIRCUIT

(75) Inventors: Rudolf Dollinger, München (DE); Roland Krimmer, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/626,313

(22) Filed: Jul. 26, 2000

Related U.S. Application Data

(63) Continuation of application No. PCT/DE99/00066, filed on Jan. 13, 1999.

(30) Foreign Application Priority Data

Jan. 26, 1998 (DE) .......................... 198 02 826

(51) Int. Cl.⁷ ................................ H04M 1/24
(52) U.S. Cl. .............. 379/27.01; 379/27.02; 379/27.08
(58) Field of Search ....................... 379/1–35

(56) References Cited

U.S. PATENT DOCUMENTS 5,202,882 A * 4/1993 Rudolf ..................... 379/27
5,956,386 A * 9/1999 Miller ........................ 379/27
6,058,161 A * 5/2000 Anderson et al. ............ 379/27

OTHER PUBLICATIONS

Published International Application No. 96/27970 (Zhou), dated Sep. 12, 1996.
Published International Application No. 98/08336 (Zhou et al.), dated Feb. 26, 1998.
"A Two–Chip Set for SLIC", Yasunobu et al., Review of the Electrical Communications Lab. 36, Nov. 1988, No. 6, Tokyo, Japan, pp. 561–565.

* cited by examiner

*Primary Examiner*—Curtis Kuntz
*Assistant Examiner*—Barry W Taylor
(74) *Attorney, Agent, or Firm*—Laurence A. Greenberg; Werner H. Stemer; Gregory L. Mayback

(57) ABSTRACT

An adjustment and current-measurement method for a subscriber line circuit of a digital telephone exchange is integrated in the low-voltage section of the subscriber line circuit. A previously determined disturbance variable, which is stored in the low-voltage section with a reversed mathematical sign, is added to the currents which are to be measured, for example, for an adjustment of the supply current or of the operability of the subscriber line circuit. This makes it possible to carry out a current measurement for already corrected current levels.

4 Claims, 2 Drawing Sheets

METHOD FOR ADJUSTING CURRENT LEVELS, WHICH HAVE BEEN FALSIFIED BY OFFSET-CURRENT LEVELS, IN A SUBSCRIBER LINE CIRCUIT

CROSS-REFERENCE TO RELATED APPLICATION

This application is a continuation of copending International Application No. PCT/DE99/00066, filed Jan. 13, 1999, which designated the United States.

BACKGROUND OF THE INVENTION

Field of the Invention

The invention relates to a method for adjusting current levels, which have been falsified by offset-current levels, in a subscriber line circuit located inside a digital telephone exchange.

Such an adjustment method is known in the form of an offset current adjustment method. The current flow on the wires of a subscriber line leading to a subscriber line circuit is interrupted by at least one relay in each case. After such an interruption, the offset-current level of the subscriber line circuit is determined through the use of a processor controlling that subscriber line circuit, in such a way that the offset current is measured a number of times. A mean value is formed from the measured offset-current levels, and the result is stored in a memory associated with the processor. If a current measurement is carried out during normal operation, for example for testing the operability of the subscriber line circuit or for adjusting the supply current for a subscriber line, the current measurement is carried out in approximately the same way, and the result is in this case corrected by the offset-current level.

The above described method is disadvantageous, because the method for current measurement carried out during normal operation as well as the adjustment of the previously established offset-current level are integrated in the firmware of the processor which controls the subscriber line circuit. Since the current levels are usually to be determined precisely in a range of microamperes ($\mu$A), the sampling rate for such current measurements should be as high as possible. The firmware for the processor for controlling the subscriber line circuit is, however, configured such that the sampling rate of, for example, 1 kHz cannot be increased any further when using this method.

A further disadvantage of this method is that any disturbance variable present in the subscriber line circuit, such as the offset current in a current measurement, is eliminated only on the basis of the firmware, but still exists in the subscriber line circuit.

This means that, for example, an adjustment of the supply current in the low-voltage section of the subscriber line circuit, whose value is normally in the range of approximately 25 mA with respect to the wires of the subscriber line, is made very difficult insofar as the offset-current level present in the low-voltage section falsifies the supply current level by about 1 mA.

A current-voltage adjustment method which relates to a subscriber line circuit is known from International Publication No. WO-A-96/27970. The subject matter disclosed in this publication describes a DC control circuit, which includes a low-pass filter to identify DC voltage fluctuations, a converter to evaluate an incremental signal, a threshold value identification element to activate compensation functions, and an accumulator, in order to produce a DC compensation voltage by incremental steps. This DC compensation voltage is converted into an analog compensation signal, and this compensation signal is then subtracted from an input voltage, which is intended for an amplifier within a so-called SLIC (Subscriber Line Interface Circuit), in order to compensate for any DC voltage fluctuations. This procedure allows the voltage fluctuations arriving at the SLIC to be compensated for. Since the conditions for incoming voltage fluctuations are different from those for offset currents that are present in the subscriber line circuit, the above described conventional compensation method is regarded as being unsuitable for the adjustment of current levels falsified by offset currents.

SUMMARY OF THE INVENTION

It is accordingly an object of the invention to provide a method for adjusting current levels falsified by offset-current levels which overcomes the above-mentioned disadvantages of the heretofore-known methods of this general type.

With the foregoing and other objects in view there is provided, in accordance with the invention, a method for adjusting current levels falsified by offset-current levels, which includes the steps of:

providing a subscriber line circuit in a digital telephone exchange, the subscriber line circuit including a high-voltage section and a low-voltage section, the high-voltage section mainly including line drivers and elements for a subscriber line indication, the low voltage section including a signal processor and serving essentially as an analog/digital interface and providing a 2-wire/4-wire conversion;

measuring, in the low-voltage section, a level of an offset current when the offset current is present, the level of the offset current having a given mathematical sign;

storing, in the low-voltage section, the level of the offset current with a mathematical sign opposite to the given mathematical sign for providing a stored level of the offset current; and adding, in the .low-voltage section, the stored level of the offset current with the mathematical sign opposite to the given mathematical sign to a current to be measured for a correction when a current measurement is to be carried out during a normal operation.

In other words, the invention solves the object of the invention in particular in that both the current measurement method and the adjustment method are integrated in the low-voltage section of the subscriber line circuit. A previously measured offset-current level for electronic components associated with the subscriber line circuit is in this case stored with the opposite i.e. reversed mathematical sign in the low-voltage section of the subscriber line circuit, and when a current measurement is to be carried out during normal operation in the low-voltage section, for example for testing the subscriber line circuit or the supply current, the stored value is added to the current to be measured.

The current measurement thus includes only current levels which have already been corrected for the offset-current levels. This is advantageous since, firstly, there is no need to apply the correction for the offset-current level after the current measurement and, secondly, the current level, for example that of a supply current, can be adjusted considerably more easily without the influence of the offset current. Apart from this, the method according to the invention. achieves a further advantage in that a higher sampling rate can be achieved for a current measurement. This is done by no longer including the current measurement method in the firmware of the processor which controls the subscriber line circuit, but by including it in the hardware of the low-voltage section.

In accordance with an advantageous mode of the invention, a current is measured for the purpose of testing the subscriber line circuit or for adjusting the supply current.

In accordance with another mode of the invention, the measuring step includes measuring offset-current levels of components in the subscriber line circuit.

Furthermore, the storage of the offset-current level in the low-voltage section is advantageously configured such that the offset-current level can be adjusted from the outside or externally. With an appropriate adaptation of the offset-current level, it is possible in some cases to avoid a subsequent adjustment of the current measurement method.

Other features which are considered as characteristic for the invention are set forth in the appended claims.

Although the invention is illustrated and described herein as embodied in a method for adjusting current levels, which have been falsified by offset-current levels, in a subscriber line circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
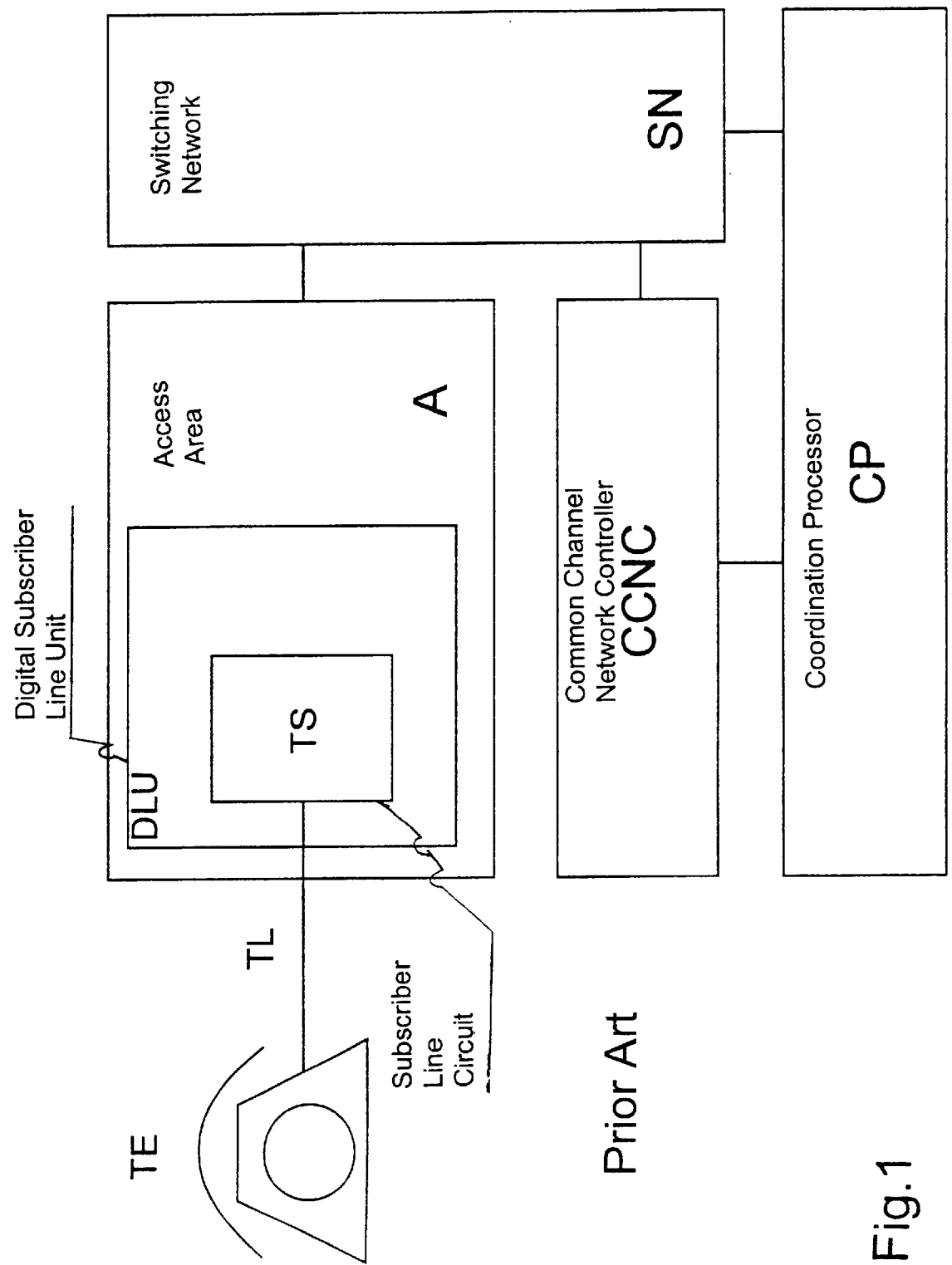
FIG. 1 is a block diagram illustrating the system architecture of a telephone exchange including a subscriber line circuit as one of the components.

Referring now to the figures of the drawings in detail and first, particularly, to FIG. 1 thereof, the are shown the central components of a digital time-division multiplex telephone exchange. Such components are a switching network SN, a signalling controller or common channel network controller CCNC, a coordination processor CP and the access area A. The access area A includes a number of digital subscriber line units DLU, to which subscriber terminals, which are indicated symbolically in FIG. 1 by a telephone TE, are connected via subscriber lines TL either directly or through the use of a private branch exchange.

The subscriber line unit DLU includes, inter alia, a number of subscriber line circuits TS, which form the interface between the subscriber lines TL and the digital environment in the telephone exchange.

FIG. 1 shows such a subscriber line circuit TS, which is used for connection of an analog subscriber line TL and from which there is a link to the switching network SN via further subcomponents in the access area, which are not shown here.

Figure 2:
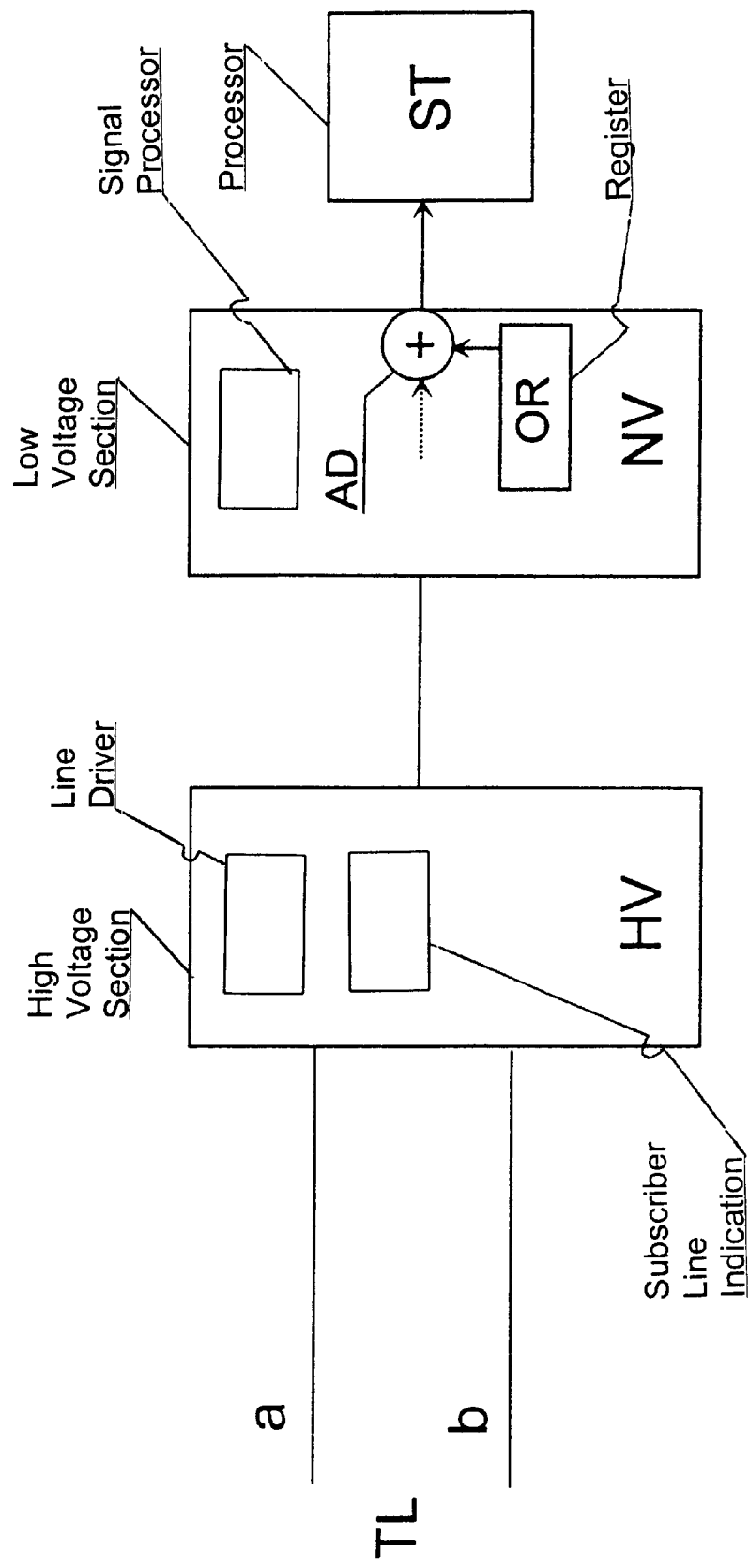
FIG. 2 is a block diagram of a subscriber line circuit to which the adjustment method according to the invention is applied.

As can be seen in FIG. 2, such a subscriber line circuit, to which the wires a and b of the subscriber line TL are connected, includes two central sections, a high-voltage section HV and a downstream-connected low-voltage section NV. Such a high-voltage section includes, in particular, line drivers and elements for subscriber line status indication. From the low-voltage section, which essentially contains elements for an analog/digital conversion, for a 2-wire/4-wire conversion, and a signal processor, there is a link to a processor ST which controls the subscriber line circuit.

If a current measurement is carried out in normal operation, for example in order to adjust the supply current or to test the operability of the subscriber line circuit, then a previously determined offset-current level, which is stored with the opposite i.e. reversed mathematical sign in the register OR, is added in the low-voltage section to the currents to be measured. Such an addition process is indicated in FIG. 2 by the circle denoted by AD. The current measurement thus includes only currents which have been adjusted by the offset-current value. Since, as a rule, the current measurement is carried out in such a way that a final current level is determined by repeated measurements and subsequent averaging, the currents are preferably measured at an increased sampling rate of, for example, 2 kHz.

As already mentioned above, the adjustment method according to the invention is used in particular to adjust the offset current in the components of a subscriber line circuit. In this case, a previously determined offset-current level is stored with the opposite mathematical sign in the low-voltage section, as the disturbance variable that is to be corrected.

As mentioned above, the adjustment method according to the invention is used in particular to adjust the offset current in the components of a subscriber line circuit. In this case, a previously determined offset-current level is stored with the opposite mathematical sign in the low-voltage section, as a disturbance variable for correction.

We claim:

1. A method for adjusting current levels falsified by offset-current levels, the method which comprises:

providing a subscriber line circuit in a digital telephone exchange, the subscriber line circuit including a high-voltage section and a low-voltage section, the high-voltage section mainly including line drivers and elements for a subscriber line indication, the low voltage section including a signal processor and serving essentially as an analog/digital interface and providing a 2-wire/4-wire conversion;

measuring, in the low-voltage section, a level of an offset current when the offset current is present, the level of the offset current having a given mathematical sign;

storing, in the low-voltage section, the level of the offset current with a mathematical sign opposite to the given mathematical sign for providing a stored level of the offset current; and adding, in the low-voltage section, the stored level of the offset current with the mathematical sign opposite to the given mathematical sign to a current to be measured for a correction when a current measurement is to be carried out during a normal operation.

2. The method according to claim 1, which comprises measuring a current for testing the subscriber line circuit.

3. The method according to claim 1, which comprises measuring a current for adjusting a supply current.

4. The method according to claim 1, wherein the measuring step includes measuring offset-current levels of components in the subscriber line circuit.

* * * * *